(12) United States Patent
Toebes et al.

(10) Patent No.: US 8,497,836 B2
(45) Date of Patent: Jul. 30, 2013

(54) IDENTIFYING USER BY MEASURING PRESSURE OF BUTTON PRESSES ON USER INPUT DEVICE

(75) Inventors: John Toebes, Cary, NC (US); Anthony John Wasilewski, Alpharetta, GA (US); Philip Clifford Jacobs, Windham, NH (US); Matthew Kuhlke, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 917 days.

(21) Appl. No.: 12/116,026

(22) Filed: May 6, 2008

(65) Prior Publication Data

US 2009/0278792 A1    Nov. 12, 2009

(51) Int. Cl.
    *G06F 3/033* (2006.01)
(52) U.S. Cl.
    USPC .......................................... 345/156; 345/168
(58) Field of Classification Search
    USPC ................................................ 345/156, 173
    See application file for complete search history.

(56) References Cited

U.S. PATENT DOCUMENTS

| | | | |
|---|---|---|---|
| 4,805,222 A | 2/1989 | Young et al. | |
| 5,557,686 A | 9/1996 | Brown et al. | |
| 5,995,026 A | 11/1999 | Sellers | |
| 2006/0132456 A1* | 6/2006 | Anson | 345/173 |
| 2010/0321156 A1* | 12/2010 | Pitt et al. | 340/5.82 |

OTHER PUBLICATIONS

U.S. Appl. No. 11/947,298, filed Nov. 29, 2007, Toebes et al.
U.S. Appl. No. 12/109,549, filed Apr. 25, 2008, Toebes et al.
U.S. Appl. No. 12/110,238, filed Apr. 25, 2008, Davi et al.
U.S. Appl. No. 12/110,224, filed Apr. 25, 2008, Toebes et al.
Wikipedia, "Remote Control", Jan. 20, 2008 [online], [retrieved on Jan. 22, 2008]. Retrieved from the Internet: <URL: http://en.wikipedia.org/w/index.php?title=Remote_control&printable=yes>, pp. 1-6.
IBI Shop, "PSYLock", [online], [retrieved on Dec. 17, 2007]. Retrieved from the Internet: <URL: http://pc50461.uni-regensburg.de/ibi/de/leistungen/research/projekte/risk/psylock_english.htm>, pp. 1-2.
Find Biometrics, "An Application of Biometric Technology: Keystroke Recognition", [online], [retrieved on Dec. 17, 2007]. Retrieved from the Internet: <URL: http://www.findbiometrics.com/Pages/signature%20articles/keystroke-recognition.html>, pp. 1-3.
Wikipedia, "Keyboard technology", Jan. 7, 2008 [online], [retrieved on Jan. 15, 2008]. Retrieved from the Internet: <URL: http://en.wikipedia.org/w/index.php?title=Keyboard_technology&printable=yes>, pp. 1-5.
Indivi Technologies Corporation, "Marketing's New Address", [online], [retrieved on Dec. 17, 2007]. Retrieved from the Internet: <URL: http://www.invidi.com/downloads/INVIDI_Advatar_Marketing.pdf>, 9 pages.

(Continued)

*Primary Examiner* — Amare Mengistu
*Assistant Examiner* — Shawna Stepp Jones
(74) *Attorney, Agent, or Firm* — Leon R. Turkevich

(57) ABSTRACT

In one embodiment, a method comprises receiving, by a user identifier circuit, a button pressure signature specifying a sequence of button pressure values sampled while a corresponding identified button of a user input device is pressed by a user; the user identifier circuit identifying the user of the user input device based on the button pressure signature; and the user identifier circuit outputting a message identifying the identified button and the identified user.

21 Claims, 3 Drawing Sheets

OTHER PUBLICATIONS

Indivi Technologies Corporation, "Advatar Targeted Television Advertising", [online], [retrieved on Dec. 17, 2007]. Retrieved from the Internet: <URL: http://www.invidi.com/downloads/INVIDI_Advatar_Advertising.pdf>, 8 pages.

"ID Control: Identity and Access Management—Keystroke ID", [online], [retrieved on Dec. 17, 2007]. Retrieved from the Internet: <URL: http://www.idcontrol.com/index.php?option=com_content&task=category&sectionid=6&id=34&Itemid=55>, pp. 1-2.

Wikipedia, "DualShock", [online], [retrieved on Dec. 17, 2007]. Retrieved from the Internet: <URL: http://en.wikipedia.org/w/index.php?title=DualShock&printable=yes>, pp. 1-3.

Wikipedia, "Biometrics", [online], [retrieved on Dec. 17, 2007]. Retrieved from the Internet: <URL: http://en.wikipedia.org/w/index.php?title=Biometrics&printable=yes>, pp. 1-11.

PSYLock, "A biometrical method based on the psychometrical feature of typing behaviour", [online], [retrieved on Dec. 17, 2007]. Retrieved from the Internet: <URL: http://pc50461.uni-regensburg.de/NR/rdonlyres/7FBCD640-8C36-41AC-A810-B308E2C1645D/0/20031015PSYLockFolderengl.pdf>, 4 pages.

* cited by examiner

IDENTIFYING USER BY MEASURING PRESSURE OF BUTTON PRESSES ON USER INPUT DEVICE

TECHNICAL FIELD

The present disclosure generally relates to identifying a user of a user input device, the user input device implemented for example as a remote control device of a television or set-top box, or a keyboard of a user computer, a cellphone, or a BlackBerry device.

BACKGROUND

User input devices utilize keyboard switches to detect a user pressing a corresponding key, where the keyboard switches are implemented according to a prescribed keyboard switch technology (e.g., mechanical switch, membrane switch, capacitive switch). Such keyboard switches have been implemented in user input devices such as remote control devices, or keyboards of computers, cellphones, BlackBerry devices, etc. Various biometric and behaviometric techniques have been attempted to identify users of such user input devices employing keyboard switches, possibly avoiding the necessity of a user performing a "logon" (e.g, user identification and password) prior to a given user session. Biometric identification techniques identify individuals based on unique physical attributes, for example fingerprints, hand shape, face recognition, iris or retina pattern, voice pattern, etc., which can be extended to include personal tags such as active badges (e.g., RFID badges). Example behaviometric techniques that identify individuals based on their behavior include written signature analysis, computer mouse gestures, and keystroke behavior analysis. Keystroke behavior analysis is based on detecting distinct typing patterns on a computer keyboard: typing patterns are determined from assigning parameters to the typing acts, such as typing speed (e.g., keys pressed per a unit time interval), dwell time (i.e, how long a key is pressed), and flight time (time between one key press and the next key press).

Keystroke behavior analysis also can be applied to a remote control devices for a television or set-top box, where user of the remote control device at least can be classified into a certain user category based on viewer surfing (i.e., channel selection) patterns.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
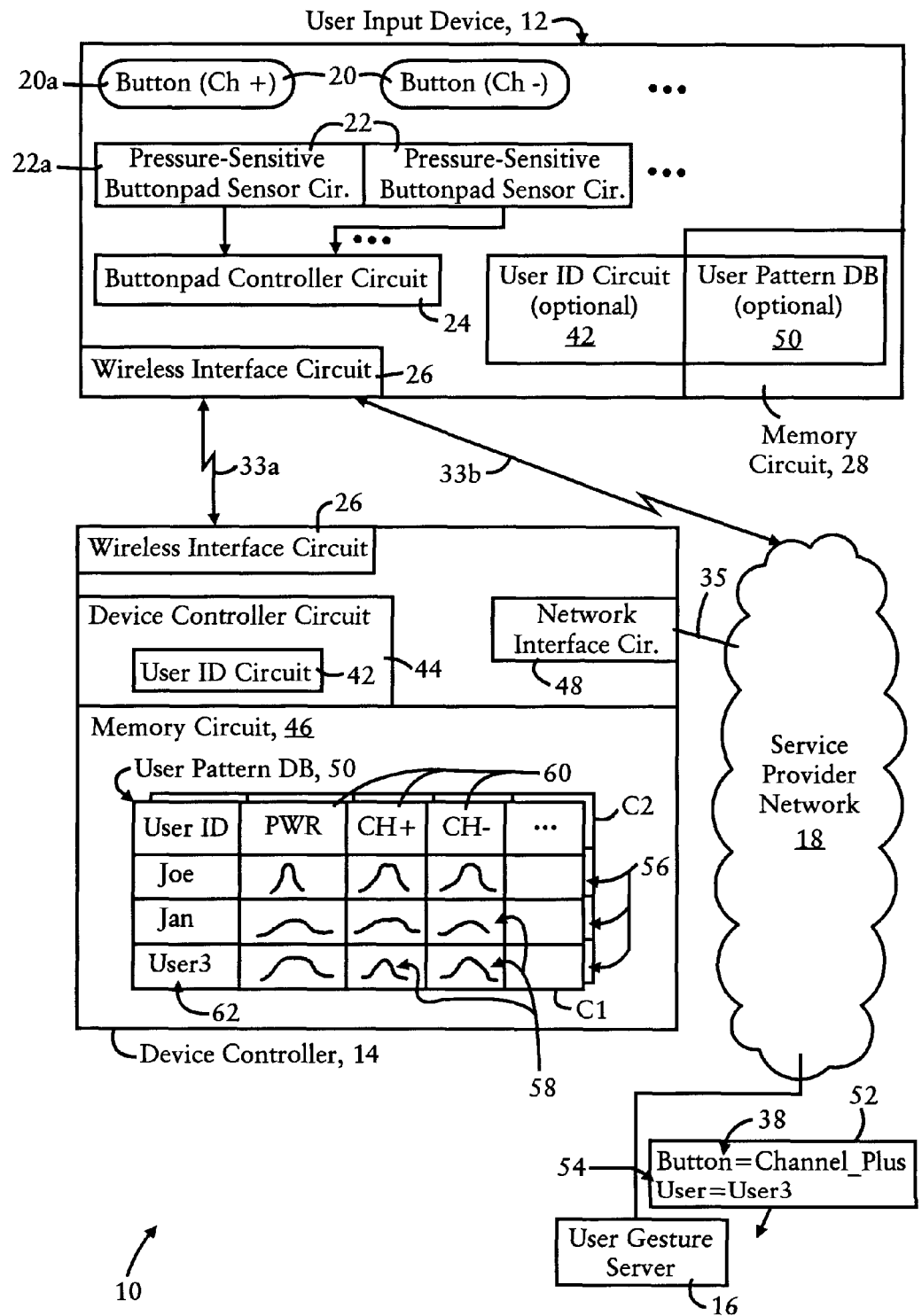
FIG. 1 illustrates an example system having a user identifier circuit configured for identifying a user of a user input device, based on a received button pressure signature specifying a sequence of button pressure values, according to an example embodiment.

In one embodiment, a method comprises receiving, by a user identifier circuit, a button pressure signature specifying a sequence of button pressure values sampled while a corresponding identified button of a user input device is pressed by a user; the user identifier circuit identifying the user of the user input device based on the button pressure signature; and the user identifier circuit outputting a message identifying the identified button and the identified user.

In another embodiment, an apparatus comprises a user identifier circuit and an interface circuit. The user identifier circuit is configured for receiving a button pressure signature specifying a sequence of button pressure values sampled while a corresponding identified button of a user input device is pressed by a user. The user identifier circuit further is configured for identifying the user of the user input device based on the button pressure signature. The interface circuit is configured for outputting, to a second device, a message identifying the identified button and the identified user.

In yet another embodiment, logic is encoded in one or more tangible media for execution and when executed operable to: receive a button pressure signature specifying a sequence of button pressure values sampled while a corresponding identified button of a user input device is pressed by a user; identify the user of the user input device based on the button pressure signature; and output a message identifying the identified button and the identified user.

DETAILED DESCRIPTION

Particular embodiments enable identification of a user of a user input device based on replacing existing keyboard switches that provide only a digital response to a user pressing the corresponding keyboard switch. The digital keyboard switches are replaced with pressure-sensitive (i.e., analog) buttons that can translate variable pressure applied by a user to at least one pressure-sensitive detector circuit. The pressure-sensitive detector circuit can measure varying amounts of pressure applied to a given input button by a user of the user input. The user of the device can be identified based on the detected pressure of the input buttons on the user input device. Hence, the use of a pressure-sensitive detector circuit enables generation of a button pressure signature for a given input button of the user input device, enabling different users of the same user input device to be distinguishable based on their respective behavior metrics with respect to pressing a given input button of the user input device.

Hence, the particular embodiments can distinguish between different users of the same user input device, based on comparing the button pressure signature (generated while a button is pressed) with known attributes of the different users regarding their respective behavior metrics in using the same user input device. If desired, the particular embodiments can identify the user of the input device using a prescribed alias (e.g., "user 1", "user 2", "user 3"), or by an actual user identity based on the user having registered with the user input device. In addition, the particular embodiments also can identify the user from a single button press by the user, based on comparing the button pressure signature from the single button press with stored button pressure signatures in a user pattern database. Hence, a different user can be identified each time the user input device is passed to a different user (e.g., multiple users contending for use of a TV remote control).

Hence, the user inputs can be correlated to an identified user (with or without knowledge of the actual user identity), enabling automatic identification of a user of the user device without the necessity of manual login by the user, and without the necessity of the user changing his or her normal behavior in operating the user input device. Moreover, the user inputs correlated to an identified user can be supplied to external devices for more precise monitoring of user activities and delivery of targeted content to the user.

FIG. 1 is a diagram illustrating an example system 10 for identifying a user of a user input device 12, according to an example embodiment. The user input device 12 can be implemented as a remote control device (e.g., a multifunction television remote) for use with a device controller 14; the user input device also can be implemented as a game controller such as the commerically-available Sony Playstation 2 Dual Shock Analog Controller (SCPH-10010), modified as described herein. The user remote 12 also can be implemented within a wireless telephone, a cell phone, a computer keyboard, a personal digital assistant (e.g., a BlackBerry device), etc.

The example system 10 also can include a device controller 14 that can communicate with the user input device 12, and a prescribed server 16 that is reachable by the user input device 12 or the device controller 14 via a service provider network 18, for example a digital cable network and/or a broadband Internet service provider network, etc.

The device controller 14 can be implemented as either a stand-alone controller, or as a controller within a consumer device controlled by the user input device 12, for example a television set, a cable or satellite set-top box, a game console (e.g., a Sony Playstation), or some other consumer device such as a wireless telephony base station, a computer appliance, a customer premises router, a Voice over IP gateway, etc.

The example user input device 12 can include a plurality of pressure-sensitive buttons 20, implemented for example as plastic membrane buttons. The user input device 12 also can include at least one pressure-sensitive buttonpad sensor circuit 22 configured for generating an analog pressure signal in response to a user pressing the corresponding button, enabling the user input device 12 to detect the relative pressure applied by a user to press any button 20 of the user input device 12. The user input device 12 also can implement a pressure-sensitive buttonpad sensor circuit 22 for each corresponding button 20 of the user input device. Conventional (i.e., digital) keyboard switches also may be added to the user input device 12, if preferred. The user input device 12 also includes a buttonpad controller circuit 24, a memory circuit 28, and a wired or wireless interface circuit 26. The wired or wireless interface circuit 26 of the user input device 12 can be configured with communication with a corresponding wired or wireless interface circuit 26 in the device controller 14 via a wired or wireless (e.g., infrared or radio frequency (RF)) data link 33a; the interface circuit 26 also can be configured for establishing a wired or wireless data link 33b with a service provider network 18, bypassing the device controller 14.

Figure 2:
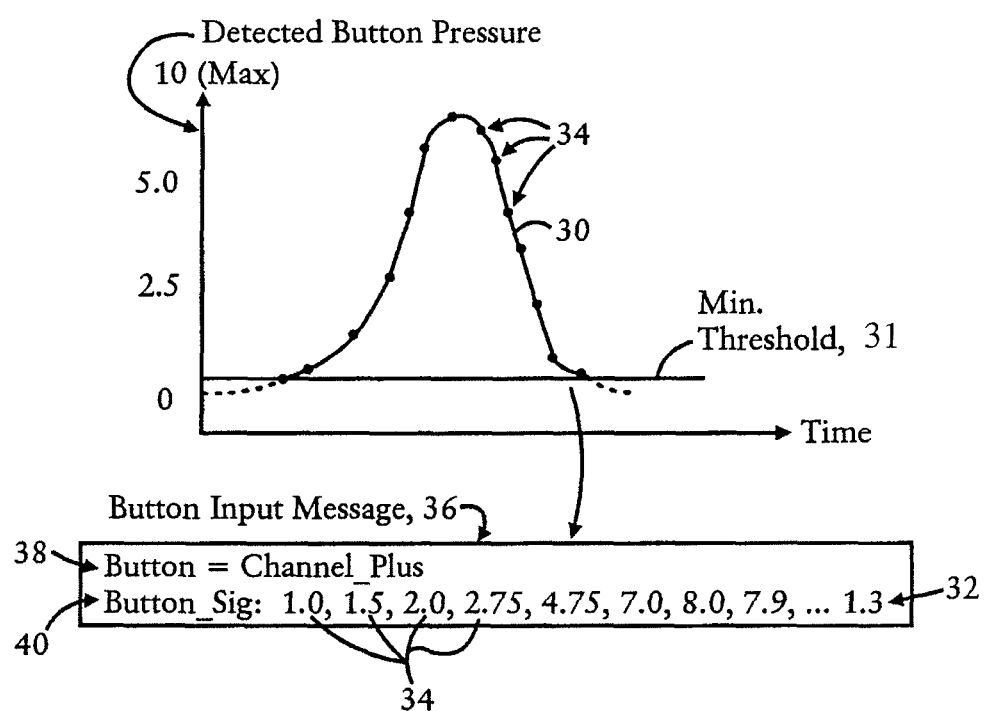
FIG. 2 illustrates an example conversion of an analog pressure signal, generated by a pressure-sensitive buttonpad sensor circuit in response to a user pressing an identified button, into a button pressure signature specifying a sequence of button pressure values sampled while the user is pressing the identified button, according to an example embodiment.

FIG. 2 illustrates an example button input message 36 generated by the buttonpad controller circuit 24, according to an example embodiment. As described below, the button input message 36 is sent to a user identifier circuit for identification of the user that pressed the corresponding button 20. Each pressure-sensitive buttonpad sensor circuit 22 of FIG. 1 (e.g., 22a) is configured for generating and outputting to the buttonpad controller circuit 24 an analog pressure signal 30 in response to detecting the corresponding button (e.g., "Ch +" for "Channel Up", 20a) being pressed by a user. If desired, any one buttonpad sensor circuit 22 also can be configured to suppress the analog pressure signal 30 until the user presses the corresponding button 20 with a sufficient pressure exceeding a prescribed minimum threshold 31; hence, any one pressure-sensitive buttonpad sensor circuit 22 can be configured to suppress the corresponding analog pressure signal 30 if the corresponding detected button pressure is below the minimum threshold 31, illustrated by the dotted line.

The buttonpad controller circuit 24 can identify the analog pressure signal 30 corresponding to the pressed button 20a based on receipt thereof via a prescribed terminal input. The buttonpad controller circuit 24 can digitize the analog pressure signal 30 for the corresponding button (e.g., 20a) based on sampling the analog pressure signal 30 at prescribed time intervals (e.g., 50 milliseconds (ms)) while the corresponding identified button 20a is pressed by the user (e.g., above the minimum threshold 31), converting the samples 34 into digital button pressure values across a prescribed dynamic range (e.g., 1 to 10), and storing the sequence 32 of button pressure values 34 in a tangible memory circuit (e.g., within the buttonpad controller circuit 24). Each of the button pressure values 34 that are sampled by the buttonpad controller circuit 24 are illustrated in FIG. 2 as dots 34 on the analog pressure signal 30. The buttonpad controller circuit 24 can then generate the button input message 36, specifying a button identifier 38 identifying the button (e.g., 20a) pressed by a user, and a button pressure signature 40 that specifies the corresponding sequence 32 of button pressure values 34 sampled by the buttonpad controller circuit 24 while the user pressed the corresponding identified button 20. The buttonpad controller circuit 24 also can output multiple concurrent button input messages 36 in response to the user simultaneously pressing multiple buttons (e.g., pressing "Shift" and "CH+" together), where the messages 36 can be output "concurrently" relative to the time that the respective buttons are pressed (e.g., within 200 milliseconds); alternately, the button input messages 36 can include time stamp values, enabling the user identifier circuit 42 to identify concurrent button presses based on similar time stamp indices (in milliseconds).

The buttonpad controller circuit 24 and/or the user identification circuit 42 also can implement thresholds in place of (or in addition to) implementing the threshold 31 in the buttonpad sensor circuits 2. For example, the buttonpad controller circuit 24 can implement a controller circuit threshold to qualify a button press as a user input: if the pressure applied by the user does not exceed the controller circuit threshold, the buttonpad controller circuit can output a "button pressed message" (as opposed to the button input message 36) that specifies the button pressed, but no signature 40, to indicate that insufficient pressure was applied by the user to constitute a user input.

Hence, the buttonpad controller circuit 24 can output multiple concurrent messages in the event that multiple buttons 20 are simultaneously pressed, where multiple concurrent button input messages 36 can represent buttons pressed simultaneously by the user (e.g., "Shift"-"CH+" for rapid channel changes), and a single input message 36 generated concurrent with one or more button pressed messages of adjacent buttons 20 can represent a case of "spill-over" (e.g., where a user applies a detected amount of pressure to a given button as a user input, and the user also applies less pressure to adjacent buttons due to finger or thumb size).

The button input message 36 (and/or any "button pressed message") generated by the buttonpad controller circuit 24 can be supplied to the device controller 14 for identification of the user of the user input device 12. Alternately, the button input message 36 can be supplied to a user identifier circuit 42 that can be implemented within the user input device 12, described below.

The device controller 14 can include a wired or wireless interface circuit 26 for receiving the button input message 36 from the user input device 12 (e.g., via an infrared or RF link). The device controller 14 also can include a device controller circuit 44 for controlling device operations (e.g., channel selection or navigation, volume control, etc.), a memory circuit 46, and a network interface circuit 48 configured for establishing a data link 35 with a service provider network 18 for communications with a destination server 16.

The device controller 14 can include a user identifier circuit 42 and a user pattern database 50 stored within the memory circuit 46. As illustrated in FIG. 1, the user identifier circuit 42 and the user pattern database 50 alternately can be implemented in the user input device 12. Assuming the user input device 12 includes the user identifier circuit 42 and the user pattern database 50 stored within the memory circuit 28, the user input device 12 can be configured for sending to the user gesture server 16 a user gesture message that identifies the user and the button pressed by the user, described in further detail below with respect FIG. 3. Hence, the interface circuit 26 of the user input device 12 can be configured for sending messages directly to the user gesture server 16 via the service provider network 18, eliminating the necessity of a device controller 14.

The user identifier circuit 42 is configured for identifying the user of the user input device 12 based on receipt of the button pressure signature 40, and generating a message 52 containing the button identifier 38 identifying the pressed button (e.g., 20a) and a user identifier 54 identifying the identified user of the user input device 12. Hence, the user identifier circuit 42 (within the device controller 14 or the user input device 12) can send the message 52 identifying the identified button and the identified user to a prescribed destination server 16 in the service provider network 18. The message 52 can be used by the server 16 in recording and tracking the user gestures (e.g., socially relevant gestures by the user), enabling the user gesture server 16 to provide content recommendations to the user of the user input device 12 based on receipt of the message 52 identifying the button pressed by the identified user. Additional information regarding tracking socially relevant gestures based on recording inputs by an identified user is described in commonly assigned, copending U.S. patent application Ser. No. 11/947,298, filed Nov. 29, 2007, entitled "Socially Collaborative Filtering".

As illustrated in FIG. 1, the user pattern database 50 can include, for each stored user 62, a corresponding set 56 of stored button pressure signatures 58 for respective pressed buttons 60 that have been pressed by the corresponding stored user 62. Although the stored button pressure signatures 58 are illustrated as curves, each stored pressure signature 58 preferably stored in the database 50 as a corresponding sequence 32 of sampled button pressure values 34. As described below with respect to FIG. 3, the user identifier circuit 42 can apply prescribed interpolation techniques, for example spline interpolation (e.g., a Bezier curve), in order to determine whether a match exists between a received button signature 40 from the buttonpad controller circuit 24 and one of the stored button pressure signatures 58.

Any one stored button pressure signature 58 also can have a corresponding assigned context tag (for example, "C1" or "C2") that associates the signature 58 with a corresponding "button input context". In particular, a specific user may press a given button 20 using different pressure, depending on the context in which the button 20 was pressed. For example, if the user input device 12 is implemented as a computer keyboard (e.g., a "QWERTY" type keyboard), a user may use distinctly different pressures in pressing the "i" button depending on whether the typed word was "I" (where the "i" button is the only typed button), "item" (where the "i" button is the first typed button in a sequence), "tilt" (where the "i" button is the second typed button in a sequence), etc. As illustrated in FIG. 1, the user pattern database 50 can store a first set of the signatures 58 for a first context "C1", a second set of signatures 58 for a second context "C2", etc. Hence, use of context tags enable multiple signatures 58 to be assigned to a single pressed button 60 for a single user, where each context tag associates the corresponding signature 58 (for the specific button 60 pressed by the specific user 62) to a corresponding stored button input context within the database 50. Any one button input context for a signature 58 can be stored in the database 50 as an identified sequence of pressed buttons (e.g., "i-t-e-m" as context 1 for user "Jan"; "t-i-l-t" as context 2 for user "Jan", etc.), or even a single button press (e.g., "i" for user "Jan"). Hence, use of context-based signature matching (i.e., selecting a signature 58 for a specific button 60 based on a matching button input context identified by a detected sequence of one or more pressed buttons) can provide even more precise matching of signatures by the user identifier circuit 42.

Any of the disclosed circuits of the user input device 12 and/or the device controller 14 can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 28 or 46) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic encoded in one or more tangible media for performing the described operations, or a software-based circuit that includes a reserved portion of processor memory for storage of application state data and application variables that are modified by execution of the executable code by a processor. The memory circuit 28 and/or 46 can be implemented, for example, using a non-volatile memory such as a programmable read only memory (PROM) or an EPROM, and/or a volatile memory such as a DRAM, etc.

Further, any reference to "outputting a message" (or the like) can be implemented based on creating the message in the form of a data structure and storing that data structure in a tangible memory medium in the disclosed apparatus (e.g., in a transmit buffer). Any reference to "outputting a message" (or the like) also can include electrically transmitting (e.g., via wired electric current or wireless electric field, as appropriate) the message stored in the tangible memory medium to another network node via a communications medium (e.g., a wired or wireless link, as appropriate) (optical transmission also can be used, as appropriate). Similarly, any reference to "receiving a message" (or the like) can be implemented based on the disclosed apparatus detecting the electrical (or optical)

transmission of the message/packet on the communications medium, and storing the detected transmission as a data structure in a tangible memory medium in the disclosed apparatus (e.g., in a receive buffer). Also note that the memory circuits 28 and/or 46 can be implemented dynamically by the user identifier circuit 42, for example based on memory address assignment and partitioning executed by the user identifier circuit 42.

Figure 3:
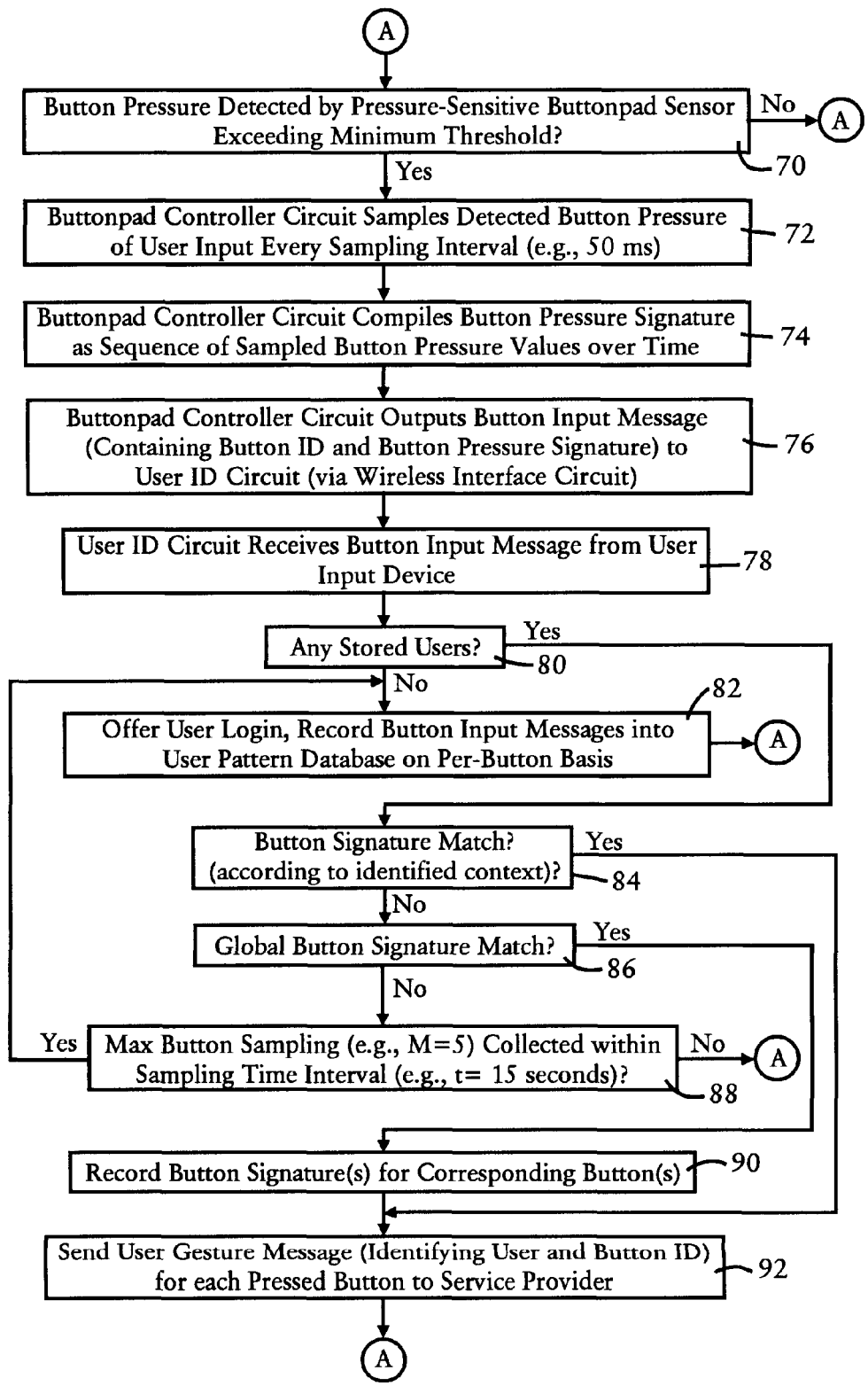
FIG. 3 illustrates an example method by the system of FIG. 1 of identifying the user of the user input device of FIG. 1, according to an example embodiment.

FIG. 3 illustrates an example method by the system of FIG. 1, according to an example embodiment. The steps described in FIG. 3 can be implemented as executable code stored on a computer readable medium (e.g., floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

As illustrated in FIG. 3, each pressure-sensitive buttonpad sensor circuit 22 in the user input device 12 determines in step 70 whether the corresponding detected button pressure (if any) exceeds the minimum threshold 31. Assuming in step 70 that at least one button 20 (e.g., 20*a*) is pressed by a user applying at least the minimum pressure to exceed the threshold 31, the corresponding buttonpad sensor circuit 22 (e.g., 22*a*) generates the analog pressure signal 30 illustrated in FIG. 2.

The buttonpad controller circuit 24 samples in step 72 the detected button pressure of the user input (as represented by the analog pressure signal 30) every sampling interval (e.g., 50 ms), in order to compile in step 74 a sequence 32 of sampled button pressure values 34 over the time that the analog pressure signal 30 is generated (e.g., while the detected button pressure exceeds the minimum pressure threshold 31). Hence, the button signature 40 compiled in step 74 by the buttonpad controller circuit 24 specifies the sequence 32 of button pressure values 34 sampled while the corresponding identified button (e.g., 20*a*) is pressed by the user.

The buttonpad controller circuit 24 outputs in step 76 at least one button input message 36 that contains the button identifier 38 for the pressed button (e.g., 20*a*) and the corresponding button pressure signature 40. Depending on implementation, the buttonpad controller circuit 24 can forward the button input message 36 to a user identifier circuit 42 within the user input device 12 (if available), or to the interface circuit 26 for transfer to the user identifier circuit 42 of the device controller that is in communication with the user input device 12. The buttonpad controller circuit also can output multiple button input messages 36 and/or button pressed messages for respective buttons that are pressed simultaneously by the user, including "spill-over" buttons (the messages are output "concurrently" relative to the time that the respective buttons 20 are pressed).

The user identifier circuit 42 receives in step 78 at least one button input message 36 (and also can receive button pressed messages), and in response attempts to identify the user of the user input device 12 using prescribed pattern recognition techniques for recognizing the button pressure signature 40. For example, the user identifier circuit 42 can determine in step 80 whether the user pattern database 50 includes any stored users 62. As used herein, the term "stored user" refers to a user identifier 62 having at least one stored button pressure signature 58 associated with the user identifier 62, regardless of whether the user identifier 62 identifies an actual user identity, or whether the user identifier 62 simply specifies an alias (e.g., "user1", "user2", "user3") to distinguish from other users of the user input device 12. If the user identifier circuit 42 determines in step 80 that the user pattern database 50 does not include any stored users 62, the user identifier circuit 42 can generate in step 82 a prompt for display to the user, offering the user an opportunity to perform a user login or registration in order to provide an initial "training" of the user identifier circuit 42 based on storing button signatures 58 for respective pressed buttons 60 into the user pattern database 50. Note that even if the user presses a key 20 to decline login, the corresponding button signature of the pressed key can be stored in the user pattern database 50 for subsequent recognition of the user. As described previously, actual registration of the user identity is optional.

Assuming in step 80 that user identifier circuit 42 detects at least one stored user 62 within the user pattern database 50, the user identifier circuit 42 can determine in step 84 whether the button pressure signature 40 specified in the button input message 36 matches a stored button pressure signature 58 for the corresponding identified button 60, for example where the supplied button signature 40 for the corresponding identified button "CH+" 38 matches the stored button pressure signature 58 for the matching pressed button "CH+" 60. As described above, the user identifier circuit 42 can apply known pattern matching techniques, for example spline interpolation, etc., in comparing the supplied button signature 40 with the stored button signatures 58. Assuming a button signature match in step 84, where the supplied button signature 40 for the corresponding identified button 38 matches the stored button pressure signature 58 for the matching pressed button 60, the user identifier circuit 42 can output in step 92 a user gesture message 52 that specifies a user identifier 54 and the button identifier 38, for delivery to the prescribed server 16 via the service provider network 18.

Assuming in step 84 that the user identifier circuit 42 determines an absence of any match between the supplied button pressure signature 40 and the stored button pressure signature 58 for the matching pressed button 60, the user identifier circuit 42 can expand the search for a matching stored button pressure signature 58 throughout the user pattern database 50 in step 86, in order to determine whether any of the stored button pressure signatures 58 match the supplied button signature 40. The user identifier circuit 42 also can utilize patterns from multiple buttons pressed simultaneously (e.g., "spill-over"). If in step 86 a match is found between the supplied button signature 40 and any of the stored button pressure signatures 58 the user identifier circuit 42 can update in step 90 the user pattern database 50 for the matching user 62 by recording the supplied button signature 40 into a corresponding pressed button entry 60 as identified by the button identifier 38. The message 52 specifying the user identifier 54 and the corresponding pressed button identifier 38 can then be output in step 92.

Hence, the user identifier circuit 42 in many instances can be configured for identifying the user after a single button press. If in certain instances additional button samplings are required in step 88 before a user can be identified, the process can be repeated for additional buttons collected within a prescribed sampling time interval, for example 15 seconds. As described previously, user identification based on matching button signatures 40 to stored signatures 58 also can be implemented in step 84 based on the user identification circuit 42 implementing context-based signature matching identifying a sequence of one or more pressed buttons to an identifiable button input context.

If in step 88 a global signature match still cannot be obtained after obtaining a maximum number of button samplings (e.g., sampling five button presses), the user identifier circuit 42 can determine that a new user is using the user input device 12, wherein the user identifier circuit 42 can return to step 82 to offer a login or training procedure for the new user.

According to the example embodiments, the user of a user input device can be identified based on the behavior metrics associated with the user, namely the user-specific tendencies in pressing the buttons on the user input device according to a distinguishable button pressure signature. Since a given user may press different buttons according to different pressure characteristics (due to position of the corresponding button on the user input device), button pressure signatures can be accumulated on a per-button basis, enabling identification of the user (relative to other available users of the user input device) from a single button press. Hence, the user of the user input device can be identified even in cases where the user input device is shared concurrently among different users contending for access to the user input device.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving, by a user identifier circuit, a button pressure signature specifying a sequence of button pressure values sampled by a pressure-sensitive detector circuit at prescribed time intervals while a corresponding identified button of a user input device is pressed by a user, the identified button being one of a plurality of buttons on the user input device, the pressure-sensitive detector circuit configured for measuring, at the prescribed time intervals, variable pressure applied by the user during a single user input via the corresponding identified button and in response generating the sequence of button pressure values as a representation of the variable pressure over time;
   the user identifier circuit identifying the user of the user input device based on the button pressure signature, the plurality of said buttons arranged as a device keyboard, enabling identification of the user based on the corresponding button pressure signature from any one of the buttons; and
   the user identifier circuit outputting a message identifying the identified button and the identified user.

2. The method of claim 1, wherein the identifying includes determining a match between the button pressure signature and at least one of stored button pressure signatures within a user pattern database, the user pattern database storing, for at least one stored user, a corresponding set of stored button pressure signatures for a corresponding set of pressed buttons that have been pressed by the one stored user.

3. The method of claim 2, wherein the determining a match includes:
   determining whether the button pressure signature matches a corresponding stored button pressure signature for the corresponding identified button; and
   selectively determining whether any of the stored button pressure signatures matches the button pressure signature, based on a determined absence of a match between the button pressure signature and the stored button pressure signature for the corresponding identified button.

4. The method of claim 3, further comprising the user identifier circuit storing the button pressure signature in the user pattern database for the corresponding identified button, based on a determined match between the button pressure signature and at least one of the stored button pressure signatures.

5. The method of claim 2, further comprising generating the button pressure signature by the pressure-sensitive detector circuit digitizing a detected analog pressure signal, the analog pressure signal generated by a pressure-sensitive buttonpad sensor circuit in response to the user pressing the identified button.

6. The method of claim 5, wherein the user input device comprises the user identifier circuit, the pressure-sensitive detector circuit, the identified button, the pressure-sensitive buttonpad sensor circuit, and the user pattern database.

7. The method of claim 2, further comprising the user identifier circuit storing the button pressure signature in the user pattern database for the corresponding identified button in the corresponding set.

8. The method of claim 7, wherein the storing includes storing the button pressure signature during a user registration operation.

9. The method of claim 2, wherein the identifying includes determining the match relative to an input context of the identified button.

10. The method of claim 1, wherein the message is output to a prescribed destination server in a service provider network.

11. An apparatus comprising:
    a user identifier circuit configured for receiving a button pressure signature specifying a sequence of button pressure values sampled by a pressure-sensitive detector circuit at prescribed time intervals while a corresponding identified button of a user input device is pressed by a user, the identified button being one of a plurality of buttons on the user input device, the pressure-sensitive detector circuit configured for measuring, at the prescribed time intervals, variable pressure applied by the user during a single user input via the corresponding identified button and in response generating the sequence of button pressure values as a representation of the variable pressure over time, the user identifier circuit further configured for identifying the user of the user input device based on the button pressure signature, the plurality of said buttons arranged as a device keyboard, enabling identification of the user based on the corresponding button pressure signature from any one of the buttons; and
    an interface circuit configured for outputting, to a second device, a message identifying the identified button and the identified user.

12. The apparatus of claim 11, further comprising a user pattern database configured for storing, for at least one stored user, a corresponding set of stored button pressure signatures for a corresponding set of pressed buttons that have been pressed by the one stored user, the user identifier circuit configured for identifying the user based on determining a match between the button pressure signature and at least one of the stored button pressure signatures.

13. The apparatus of claim 12, wherein user identifier circuit further is configured for determining the match based on:
    determining whether the button pressure signature matches a corresponding stored button pressure signature for the corresponding identified button; and
    selectively determining whether any of the stored button pressure signatures of pressed buttons matches the button pressure signature, based on a determined absence of a match between the button pressure signature and the stored button pressure signature for the corresponding identified button.

14. The apparatus of claim 13, wherein the user identifier circuit is configured for storing the button pressure signature in the user pattern database for the corresponding identified button, based on a determined match between the button pressure signature and at least one of the stored button pressure signatures.

15. The apparatus of claim 12, wherein the apparatus includes the pressure-sensitive detector circuit, the pressure-sensitive detector circuit comprising:
   a pressure-sensitive buttonpad sensor circuit configured for generating an analog pressure signal in response to the user pressing the identified button;
   the pressure-sensitive detector circuit configured for generating the button pressure signature by digitizing the analog pressure signal.

16. The apparatus of claim 12, wherein the user identifier circuit is configured for storing the button pressure signature in the user pattern database for the corresponding identified button.

17. The apparatus of claim 16, wherein the user identifier circuit is configured for storing the button pressure signature during a user registration operation.

18. The apparatus of claim 12, wherein the user pattern database is configured for storing a plurality of stored button pressure signatures for at least one pressed button relative to respective input contexts, the user identifier circuit configured for determining the match relative to the input context of the identified button.

19. The apparatus of claim 11, wherein the second device is a prescribed destination server in a service provider network.

20. An apparatus comprising:
   means for receiving a button pressure signature specifying a sequence of button pressure values sampled by a pressure-sensitive detector circuit at prescribed time intervals while a corresponding identified button of a user input device is pressed by a user, the identified button being one of a plurality of buttons on the user input device, the pressure-sensitive detector circuit configured for measuring, at the prescribed time intervals, variable pressure applied by the user during a single user input via the corresponding identified button and in response generating the sequence of button pressure values as a representation of the variable pressure over time, the means for receiving further configured for identifying the user of the user input device based on the button pressure signature, the plurality of said buttons arranged as a device keyboard, enabling identification of the user based on the corresponding button pressure signature from any one of the buttons; and
   an interface circuit configured for outputting, to a second device, a message identifying the identified button and the identified user.

21. Logic encoded in one or more non-transitory tangible media for execution and when executed operable to: receive a button pressure signature specifying a sequence of button pressure values sampled by a pressure-sensitive detector circuit at prescribed time intervals while a corresponding identified button of a user input device is pressed by a user, the identified button being one of a plurality of buttons on the user input device, the pressure-sensitive detector circuit configured for measuring, at the prescribed time intervals, variable pressure applied by the user during a single user input via the corresponding identified button and in response generating the sequence of button pressure values as a representation of the variable pressure over time; identify the user of the user input device based on the button pressure signature, the plurality of said buttons arranged as a device keyboard, enabling identification of the user based on the corresponding button pressure signature from any one of the buttons; and output a message identifying the identified button and the identified user.

* * * * *